United States Patent
Sweeney et al.

(10) Patent No.: US 6,544,321 B1
(45) Date of Patent: Apr. 8, 2003

(54) NANOSCOPIC PIGMENTS

(75) Inventors: Maura A. Sweeney, Rochester, NY (US); Thomas W. Smith, Penfield, NY (US); Melvin D. Croucher, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/036,614

(22) Filed: Nov. 7, 2001

(51) Int. Cl.[7] .......................... C09D 11/02; C09B 67/00
(52) U.S. Cl. ..................... 106/31.27; 106/31.65; 106/31.86; 106/493; 106/494; 106/495; 106/496; 106/497; 106/498; 106/499; 347/100
(58) Field of Search ................... 106/31.27, 31.65, 106/31.86, 499, 493, 494, 495, 496, 497, 498; 347/100

(56) References Cited

U.S. PATENT DOCUMENTS

| | | | | |
|---|---|---|---|---|
| 4,576,649 A | * | 3/1986 | Oliver et al. | 106/31.75 |
| 4,664,715 A | * | 5/1987 | Jesse | 106/402 |
| 4,705,567 A | | 11/1987 | Hair et al. | 106/20 |
| 4,785,088 A | * | 11/1988 | Flohr et al. | 540/125 |
| 4,851,549 A | * | 7/1989 | Flohr et al. | 544/225 |
| 4,937,338 A | * | 6/1990 | Flohr et al. | 544/225 |
| 6,142,618 A | | 11/2000 | Smith et al. | 347/85 |
| 6,270,214 B1 | | 8/2001 | Smith et al. | 347/101 |

FOREIGN PATENT DOCUMENTS

EP            272 649           *    6/1988

* cited by examiner

*Primary Examiner*—Anthony J. Green
(74) *Attorney, Agent, or Firm*—Judith L. Byorick

(57) ABSTRACT

Disclosed are pigment particles prepared by a process which comprises (a) preparing a solution of a polyalkylene oxide compound in water; (b) preparing a solution of a cationic dye in water; (c) admixing the solution containing the polyalkylene oxide compound with the solution containing the cationic dye to form a mixture; (d) adding to the mixture a solution containing a heteropolyacid in water, an alcohol, or a mixture thereof, thereby resulting in formation of pigment particles having an average particle diameter of no more than about 300 nanometers; and (e) after addition of the heteropolyacid to the mixture, neutralizing the mixture by addition of a base. Another embodiment of the present invention is directed to an ink composition comprising water and the aforementioned pigment particles.

20 Claims, No Drawings

NANOSCOPIC PIGMENTS

BACKGROUND OF THE INVENTION

The present invention is directed to pigment particles suitable for use as colorants. More specifically, the present invention is directed to pigment particles nanoscopic in size and suitable for use in a wide variety of applications, including aqueous ink jet inks. One embodiment of the present invention is directed to pigment particles prepared by a process which comprises (a) preparing a solution of a polyalkylene oxide compound in water; (b) preparing a solution of a cationic dye in water; (c) admixing the solution containing the polyalkylene oxide compound with the solution containing the cationic dye to form a mixture; (d) adding to the mixture a solution containing a heteropolyacid in water, an alcohol, or a mixture thereof, thereby resulting in formation of pigment particles having an average particle diameter of no more than about 300 nanometers; and (e) after addition of the heteropolyacid to the mixture, neutralizing the mixture by addition of a base. Another embodiment of the present invention is directed to an ink composition comprising water and the aforementioned pigment particles.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," IBM Technical Disclosure Bulletin, Vol. 16, No. 4, Sep. 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop-on-demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Patent 5,041,849, U.S. Pat. No. 4,751,529, U.S. Pat. No. 4,751,530, U.S. Patent 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 ( May 1, 1989) and references therein, the disclosure of which is totally incorporated herein by reference.

Other known droplet ejectors include those of the type disclosed in, for example, U.S. Pat. No. 6,127,198, the disclosure of which is totally incorporated herein by reference.

U.S. Pat. No. 4,705,567 (Hair et al.), the disclosure of which is totally incorporated herein by reference, discloses a heterophase ink composition comprising water and a dye covalently attached to a component selected from the group consisting of poly(ethylene glycols) and poly(ethylene imines), which component is complexed with a heteropolyanion.

U.S. Pat. No. 6,270,214 (Smith et al.), the disclosure of which is totally incorporated herein by reference, discloses a process which comprises (a) applying to a substrate a fixing fluid which comprises a material selected from the group consisting of (1) block or graft copolymers of dialkylsiloxanes and polar, hydrophilic monomers capable of interacting with an ink colorant to cause the colorant to become complexed, laked, or mordanted, (2) organopolysiloxane copolymers having functional side groups capable of interacting with an ink colorant to cause the colorant to become complexed, laked, or mordanted, (3) perfluorinated polyalkoxy polymers, (4) perfluoroalkyl surfactants having thereon at least one group capable of interacting with an ink colorant to cause the colorant to become complexed, laked, or mordanted, and (5) mixtures thereof; (b) incorporating into an ink jet printing apparatus an ink composition which comprises water and a colorant which becomes complexed, laked, or mordanted upon contacting the fixing fluid; and (c) causing droplets of the ink composition to be ejected in an imagewise pattern onto the substrate.

U.S. Pat. No. 6,142,618 (Smith et al.), the disclosure of which is totally incorporated herein by reference, discloses a fluid deposition apparatus comprising (a) a fluid supply, (b) a porous fluid distribution member in operative connection with the fluid supply, enabling wetting of the fluid distribution member with a fluid, and (c) a porous metering membrane situated on the fluid distribution member, whereby the metering membrane enables uniform metering of the fluid from the fluid distribution member onto a substrate.

While known compositions and processes are suitable for their intended purposes, a need remains for improved colorant compositions. In addition, a need remains for pigment particles with a color gamut and brilliance comparable to those of dyes. Further, a need remains for pigment particles of relatively uniform average particle diameter. Additionally, a need remains for pigment particles that can be dispersed in water without the need for surfactants or dispersing agents. There is also a need for aqueous inks containing pigment colorants and having a color gamut and brilliance comparable to inks containing dye colorants. In addition, there is a need for aqueous inks containing pigment particles that are of nanoscopic dimensions and are suitable for formulation of inks for use in ink jet drop ejectors (nozzles) at densities of 1200 jets per inch. Further, there is a need for aqueous inks that enable generation of images with good image permanence. Additionally, there is a need for aqueous inks that enable generation of images with good print resolution. A need also remains for aqueous inks that enable generation of images with good waterfastness. In addition, a need remains for aqueous inks that enable generation of images with good archival qualities. Further, a need remains for aqueous inks with the aforementioned advantages that are suitable for use in ink jet printing processes. Additionally, a need remains for aqueous inks with the aforementioned advantages that are suitable for use in thermal ink jet printing processes.

SUMMARY OF THE INVENTION

The present invention is directed to pigment particles prepared by a process which comprises (a) preparing a solution of a polyalkylene oxide compound in water; (b) preparing a solution of a cationic dye in water; (c) admixing the solution containing the polyalkylene oxide compound with the solution containing the cationic dye to form a mixture; (d) adding to the mixture a solution containing a heteropolyacid in water, an alcohol, or a mixture thereof, thereby resulting in formation of pigment particles having an average particle diameter of no more than about 300 nanometers; and (e) after addition of the heteropolyacid to the mixture, neutralizing the mixture by addition of a base. Another embodiment of the present invention is directed to an ink composition comprising water and the aforementioned pigment particles.

DETAILED DESCRIPTION OF THE INVENTION

The pigment particles of the present invention are prepared by admixing a polyalkylene oxide compound, a cationic dye, and a heteropolyacid. While not being limited to any particular theory, it is believed that the pigment particles of the present invention comprise an amalgam or blend of (a) the reaction product of the heteropolyacid and the cationic dye, and (b) the reaction product of the heteropolyacid and the polyalkylene oxide compound.

The polyalkylene oxide compound can be any nonionic surfactant containing repeat ethylene oxide and/or propylene oxide repeat units. Examples of suitable polyalkylene oxide compounds include ethylene oxide/propylene oxide block copolymers, such as those commercially available under the PLURONIC® name, ethoxylated alcohols, such as those commercially available under the PETROLITE® name, alkoxylated siloxanes, such as those commercially available under the SILWET® name, alkoxylated alkylpolyglycosides, such as those commercially available under the GLUCOPON® name, and the like, as well as mixtures thereof. One example of a suitable class of materials is that of alkyl aryl polyalkylene oxide compounds, of the general formula

R—Ar—(OCH$_2$CHR$^1$)$_n$—OH wherein R$^1$ is a hydrogen atom or a methyl group, n is an integer representing the number of repeat alkylene oxide groups, typically being from about 6 to about 60, and preferably from about 6 to about 30, although the value of n can be outside of these ranges, Ar is an aryl group (including substituted aryl groups), typically with from about 6 to about 14 carbon atoms, and preferably from about 6 to about 10 carbon atoms, although the number of carbon atoms can be outside of these ranges, and R is an alkyl group (including linear, branched, saturated, unsaturated, cyclic, and substituted alkyl groups), typically with from 1 to about 22 carbon atoms, and preferably from 1 to about 12 carbon atoms, although the number of carbon atoms can be outside of these ranges, wherein the substituents on the substituted alkyl and aryl groups can be (but are not limited to) hydroxy groups, amine groups, ammonium groups, pyridine groups, pyridinium groups, ether groups, ester groups, amide groups, carbonyl groups, sulfide groups, phosphonium groups, halogen atoms, and the like, wherein two or more substituents can be joined together to form a ring. The polyalkylene oxide chain can be substituted with, for example, sulfate or sulfonate groups. Examples of suitable polyalkylene oxide compounds include ethoxylated alkylphenols, which are widely commercially available as, for example, surfactants in the TRITON® series, available from Aldrich Chemical Co., Milwaukee, Wis., surfactants in the TERGITOL® series, available from Dow Chemical Co., Midland, Mich., surfactants in the IGEPAL® series, available from Rhone-Poulenc Surfactants and Specialties, Cranbury, N.J., and the like. For example, among the TRITON® surfactant series, of those of the general formula

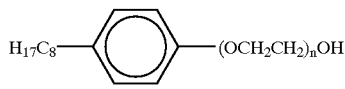

TRITON® X114, wherein n has an average value of about 7 to 8, TRITON® X100, wherein n has an average value of about 9 to 10, TRITON® X102, wherein n has an average value of about 12 to 13, TRITON® X305, wherein n has an average value of about 30, TRITON® X405, wherein n has an average value of about 40, and TRITON® X705, wherein n has an average value of about 70, are particularly suitable for the present invention.

Examples of suitable cationic dyes include Basic Yellow 51, of the formula

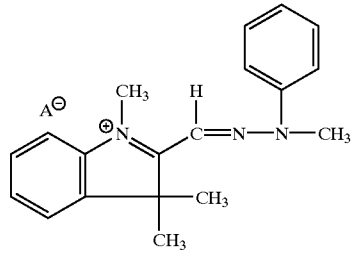

wherein A is any desired or suitable anion, such as the conjugate base of a strong acid, including chloride, bromide, iodide, methylsulfonate, tosylate, triflate, tetrafluoroborate, trifluoromethane sulfonate, hexaflulorophosphate, or the like, any of the family of Rhodamine dyes, such as Rhodamine 6G (Basic Red 1), Rhodamine 123 hydrate, Rhodamine B, Rhodamine 6G Perchlorate, Rhodamine 6G tetrafluoroborate, Rhodamine 110, and the like, of the general formula

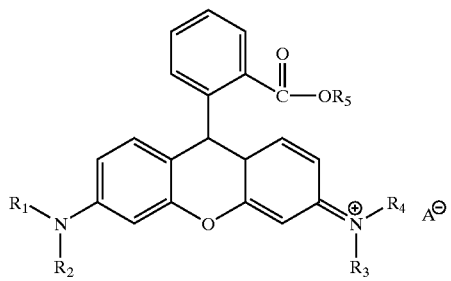

wherein R$_1$, R$_2$, R$_3$, R$_4$, and R$_5$ each, independently of the others, is a hydrogen atom, a methyl group, or an ethyl group, and A is any desired or suitable anion, such as the conjugate base of a strong acid, including chloride, bromide, iodide, methylsulfonate, tosylate, triflate, tetrafluoroborate, trifluoromethane sulfonate, hexaflulorophosphate, or the like, Victoria Blue B (Basic Blue 26), of the formula

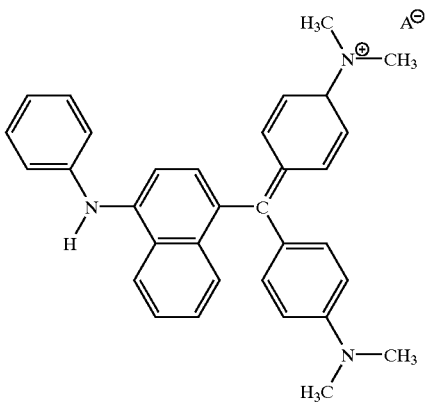

wherein A is any desired or suitable anion, such as the conjugate base of a strong acid, including chloride, bromide, iodide, methylsulfonate, tosylate, triflate, tetrafluoroborate, trifluoromethane sulfonate, hexafluorophosphate, or the like, Methyl Yellow, Methyl Violet (Solvent Violet 8), Auramine O (Basic Yellow 2), and the like, Basic Yellow dyes No. 17, 21, and the like, Basic Red dyes No. 2, 5, 9, 29, and the like, Basic Blue dyes No. 6, 7, 9, 11, 12, 16, 17, 24, 41, 47, 66, and the like, and any other Basic dyes, as well as mixtures thereof.

Heteropolyacids, also known as polyoxometalates, are acids comprising inorganic metal-oxygen clusters. These materials are discussed in, for example, "Polyoxometalate Chemistry: An Old Field with New Dimensions in Several Disciplines," M. T. Pope et al., Angew. *Chem. Int. Ed. Engl.*, Vol. 30, p. 34 (1991), the disclosure of which is totally incorporated herein by reference. Examples of suitable heteropolyacids include phosphotungstic acid, of the general formula $$H_3PO_4 \cdot 12WO_3 \cdot XH_2O$$

(wherein X is variable, with common values including (but not being limited to) 12, 24, or the like), silicotungstic acid, of the general formula $$H_4SiO_2 \cdot 12WO_3 \cdot XH_2O$$

(wherein X is variable, with common values including (but not being limited to) 12, 24, 26, or the like), phosphomolybdic acid, of the general formula $$12MoO_3 \cdot H_3PO_4 \cdot XH_2O$$

(wherein X is variable, with common values including (but not being limited to) 12, 24, 26, or the like) and the like, all commercially available from, for example, Aldrich Chemical Co., Milwaukee, Wis., as well as mixtures thereof.

The pigment particles of the present invention are prepared by admixing the polyalkylene oxide compound, the cationic dye, and the heteropolyacid. More specifically, the polyalkylene oxide compound is dissolved in water or dispersed to form micelles in water, typically in a concentration of at least about 0.0001 Molar, preferably at least about 0.001 Molar, and more preferably at least about 0.009 Molar, and typically no more than about 2 Molar, preferably no more than about 1.5 Molar, and more preferably no more than about 1 Molar, although the amount can be outside of these ranges. The cationic dye is also dissolved in water, typically in a concentration of at least about 0.5 percent by weight, preferably at least about 1 percent by weight, and more preferably at least about 2 percent by weight, and typically no more than about 5 percent by weight, and preferably no more than about 4 percent by weight, although the amount can be outside of these ranges.

These two solutions are then mixed together. The mixture of the polyalkylene oxide compound and the cationic dye is subsequently stirred and heated, typically to a temperature of from about 50 to about 90° C., and preferably from about 60 to about 80° C., although the temperature can be outside of these ranges, for a period typically of from about 20 to about 60 minutes, and preferably from about 20 to about 40 minutes, although the time can be outside of these ranges. After the heating process, the mixture is allowed to cool to room temperature (typically from about 20 to about 25° C., although the temperature can be outside of this range) with stirring.

The cooled mixture is then titrated with a solution containing the heteropolyacid in water, an alcohol (such as a glycol, methanol, ethanol, isopropanol, or the like), or a mixture thereof. The heteropolyacid solution contains the polyacid typically in a concentration of at least about 0.03 Molar, preferably at least about 0.035 Molar, and more preferably at least about 0.05 Molar, and typically no more than about 0.2 Molar, and preferably no more than about 0.1 Molar, although the amount can be outside of these ranges. During this titration process, the heteropolyacid solution is added dropwise slowly while vigorous stirring takes place until the desired amount of heteropolyacid has been added to the mixture. The heteropolyacid is added in an amount so that the molar ratio of heteropolyacid to polyalkylene oxide compound is typically at least about 1:1, and preferably at least about 5:1, and typically no more than about 7:1, preferably no more than about 6:1, and more preferably no more than about 5.5:1, although the amount can be outside of these ranges.

During the addition of the heteropolyacid solution to the aqueous mixture of polyalkylene oxide compound and cationic dye, the solution remains transparent at first, and later exhibits some cloudiness. The heteropolyacid is added until particle nucleation occurs. If too much heteropolyacid is added, massive flocculation is observed. The amount of heteropolyacid added to the mixture can be optimized by titration and subsequent particle analysis of the obtained product to determine the amount of heteropolyacid that results in formation of pigment particles of the desired size.

Thereafter, the mixture containing the solid pigment particles is neutralized by addition of a strong base, such as an alkali metal hydroxide such as sodium hydroxide or potassium hydroxide, an alkaline earth metal hydroxide, ammonium hydroxide, a tetraalkyl ammonium hydroxide, an amine, or the like, to a pH typically of from about 5 to about 8, and preferably from about 6 to about 7, although the pH can be outside of these ranges. The neutralization process neutralizes protons associated with the heteropolyacid and prevents further changing or growing of the particle size of the pigment particles formed.

The pigment particles of the present invention have an average particle diameter typically of at least about 50 nanometers, preferably at least about 80 nanometers, and more preferably at least about 100 nanometers, and typically of no more than about 300 nanometers, preferably no more than about 250 nanometers, and more preferably no more than about 200 nanometers, although the particle size can be outside of these ranges. The particles frequently are of relatively uniform size, with a typical particle size distribution of GSD equal to no more than about 1.3, preferably no more than about 1.2, and more preferably no more than about 1.1, although the particle size distribution can be outside of these ranges. Particle size can be measured by any desired technique, such as transmission electron microscopy, doppler shifted light scattering measurements, or the like.

The pigment particles of the present invention are particularly suitable for applications such as aqueous inks, including those used for ink jet printing. When the pigment particles are intended for use in an aqueous ink, the ink preparation process can be simplified by eliminating any particle isolation step; the other ink ingredients can simply be added to the aqueous neutralized dispersion of pigment particles resulting from the particle preparation process. If desired, however, the particles can also be isolated by any desired or suitable method, such as filtration, lyophilization, dialysis, ultracentrifugation, evaporation of solvent, combinations of these techniques, or the like, and redispersed in other materials. Given the nanoscopic size of the particles, addition of a resin binder and stripping of solvent can be a preferred method for dispersion of the particles in another material or medium. Examples of other applications of the pigment particles of the present invention include colorants in toners for electrostatic imaging processes such as xerography, emulsion aggregation toner manufacturing processes, biological applications, such as tissue staining, optical microscopy stains, flexographic inks, particulate dispersions for use in displays, or the like.

In aqueous ink compositions, the pigments are stabilized by the nonionic segments of the surfactants and/or ionized groups on the surfaces of the particles, and usually there is no need to add an additional surfactant or dispersing agent to the ink to maintain the particles in a stable condition in the ink. The present invention, however, also includes inks in which additional surfactants or dispersing agents are contained.

Aqueous ink compositions of the present invention comprise water and the pigment particles according to the present invention. The ink comprises an aqueous liquid vehicle. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

The inks of the present invention contain the pigment particles in any desired or effective amount, typically at least about 2 percent by weight of the ink, preferably at least about 3 percent by weight of the ink, and more preferably at least about 4 percent by weight of the ink, and typically no more than about 10 percent by weight of the ink, preferably no more than about 8 percent by weight of the ink, and more preferably no more than about 6 percent by weight of the ink, although the amount can be outside of these ranges. If desired, other colorants such as pigments, dyes, or mixtures thereof can also be included in the inks of the present invention.

Other optional additives to the inks include biocides such as DOWICIL® 150, 200, and 75, benzoate salts, sorbate salts, PROXEL® GXL and BD20, available from Zeneca, PARADYME®, available from Zeneca, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

When used in ink jet printing applications, the ink compositions according to the present invention are generally of a viscosity suitable for use in said ink jet printing processes. For example, for thermal ink jet printing applications, at room temperature (i.e., about 25° C.), typically, the ink viscosity is typically at least about 1 centipoise and typically is no more than about 10 centipoise, preferably no more than about 7 centipoise, and more preferably no more than about 5 centipoise, although the viscosity can be outside of these ranges, particularly when the ink is used for applications such as acoustic ink jet printing. When used in marking pen applications, the ink compositions are generally of a viscosity suitable for use in said applications.

The ink compositions can be of any suitable or desired pH.

For some embodiments, such as thermal ink jet printing processes, typical pH values are at least about 2, preferably at least about 3, and more preferably at least about 5, and typically up to about 11, preferably up to about 10, and more preferably up to about 9, although the pH can be outside of these ranges.

The ink compositions can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The ink compositions of the present invention can be used in a process which entails incorporating the ink composition into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Cyan, magenta, and yellow pigment particles were prepared as follows. An aqueous solution containing $9 \times 10^{-4}$ mole of ethoxylated alkylphenol (TRITON® X-405, obtained from Union Carbide, New York, N.Y.) was admixed with a basic dye identified in the table below and in the amount indicated in the table below. The mixture thus formed was then heated to 80° C. for a period of 20 minutes and subsequently allowed to cool to ambient temperature (about 20° C.) with continued stirring. The cooled mixture was then slowly titrated with an aqueous solution of 0.03472 molar phosphotungstic acid (obtained from Aldrich Chemical Co., Milwaukee, Wis.) with constant mixing until the calculated amount had been added. This amount was previously determined by routine experimentation in which differing amounts of phosphotungstic acid solution were added to similar mixtures followed by measuring the resulting particle size of the pigment particles thus formed. Thereafter, the mixture was stirred while neutralization was performed by addition of ammonium hydroxide. Base titration of the pigment particles indicated that an optimal pH was about 7 or lower. When neutralization was complete, the resulting dispersion of pigment particles was examined for particle shape and size by transmission electron microscopy and confirmed using doppler shifted light scattering measurements.

|  | Basic Yellow 51 | Rhodamine 6G | Victoria Blue B |
| --- | --- | --- | --- |
| supplier | Aldrich | Aldrich | Aldrich |
| amount added | 0.015 mole | 0.01 mole | 0.009 mole |
| average particle diameter | 121 nanometers | 79 nanometers | 45 nanometers |
| particle diameter GSD | 1.11 | 1.03 | 1.02 |
| amount phosphotungstic acid added | $2.5 \times 10^{-4}$ Molar | $3.0 \times 10^{-4}$ Molar | $2.8 \times 10^{-4}$ Molar |

-continued

|  | Basic Yellow 51 | Rhodamine 6G | Victoria Blue B |
| --- | --- | --- | --- |
| amount TRITON® X-405 added | $9 \times 10^{-4}$ Molar | $9 \times 10^{-4}$ Molar | $9 \times 10^{-4}$ Molar |

The color gamut of these solutions was also assessed with an X-RITE 938 densitometer. For comparison purposes, aqueous solutions containing 3 percent by weight of a laked pigment of the same dye from which the ternary pigment particles of the present invention were made were also assessed for color gamut. The results were as follows:

|  | Basic Yellow 51 laked | Basic Yellow 51 ternary | Rhodamine 6G laked | Phodamine 6G ternary | Victoria Blue B laked | Victoria Blue B ternary |
| --- | --- | --- | --- | --- | --- | --- |
| L | 93.63 | 93.91 | 65.85 | 68.60 | 30.92 | 33.79 |
| a* | −6.83 | −8.05 | 77.60 | 78.58 | 16.77 | 11.44 |
| b* | 109.3 | 101.1 | 10.01 | 0.37 | −78.69 | −75.11 |
| density | 1.097 | 0.966 | 1.191 | 1.938 | 2.35 | 1.96 |
| λ (nm) | 440 | 440 | 540 | 540 | 580 | 580 |

As the data indicate, the ternary pigment particles of the present invention in many instances exhibited color gamut and brilliance comparable to that of laked pigments of the dyes from which they were prepared.

EXAMPLE II

Ink compositions were prepared by simple mixing of the following ingredients. The pigments used were the ternary pigments prepared in Example I. The SILWET® material was obtained from Crompton Corporation, Greenwich, Conn. Amounts shown are percent by weight.

| Ink | Cyan | Magenta | Yellow |
| --- | --- | --- | --- |
| pigment | 4 | 3 | 2.5 |
| sulfolane | 22 | 22 | 22 |
| 2-pyrrolidinone | 5 | 5 | 5 |
| SILWET L-7200 | 0.1 | 0.1 | 0.1 |
| polyethylene oxide | 0.05 | 0.05 | 0.05 |
| deionized water | 68.85 | 69.85 | 70.35 |

The inks thus prepared were incorporated into a HEWLETT-PACKARD 694c ink jet printer and used to generate images on paper and transparency stock. The inks exhibited excellent color gamut, excellent projection efficiency on XEROX® transparencies, waterfastness values of greater than 90 percent on XEROX® Color Xpressions paper, and wet and dry smear of less than 0.05 on this paper.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. Pigment particles prepared by a process which comprises (a) preparing a solution of a polyalkylene oxide compound in water; (b) preparing a solution of a cationic dye in water; (c) admixing the solution containing the polyalkylene oxide compound with the solution containing the cationic dye to form a mixture; (d) adding to the mixture a solution containing a-heteropolyacid in (i) water, (ii) an alcohol, or (iii) a mixture thereof, thereby resulting in formation of pigment particles having an average particle diameter of no more than about 300 nanometers: and (e) after addition of the heteropolyacid to the mixture, neutralizing the mixture by addition of a base.

2. Pigment particles according to claim 1 wherein the polyalkylene oxide compound is an ethylene oxide/propylene oxide block copolymer, an ethoxylated alcohol, an alkoxylated siloxane, an alkoxylated alkylpolyglycoside, or mixtures thereof.

3. Pigment particles according to claim 1 wherein the polyalkylene oxide compound is an alkyl aryl polyalkylene oxide compound.

4. Pigment particles according to claim 1 wherein the polyalkylene oxide compound is of the general formula

R—Ar—(OCH$_2$CHR$^1$)$_n$—OH wherein R$^1$ is a hydrogen atom or a methyl group, n is an integer representing the number of repeat alkylene oxide groups, Ar is an aryl group, and R is an alkyl group.

5. Pigment particles according to claim 1 wherein the polyalkylene oxide compound is of the general formula

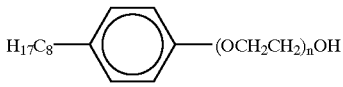

H$_{17}$C$_8$—⟨phenyl⟩—(OCH$_2$CH$_2$)$_n$OH wherein n has an average value of no less than about 7, and wherein n has an average value of no more than about 70.

6. Pigment particles according to claim 1 wherein the cationic dye is Basic Yellow 51, Rhodamine 6G (Basic Red 1), Rhodamine 123 hydrate, Rhodamine B, Rhodamine 6G Perchlorate, Rhodamine 6G tetrafluoroborate, Rhodamine 110, Basic Blue 26, Methyl Yellow, Methyl Violet, Basic Yellow 2, Basic Yellow 17, Basic Yellow 21, Basic Red 2, Basic Red 5, Basic Red 9, Basic Red 29, Basic Blue 6, Basic Blue 7, Basic Blue 9, Basic Blue 11, Basic Blue 12, Basic Blue 16, Basic Blue 17, Basic Blue 24, Basic Blue 41, Basic Blue 47, Basic Blue 66, or mixtures thereof.

7. Pigment particles according to claim 1 wherein the heteropolyacid is phosphotungstic acid, silicotungstic acid, phosphomolybdic acid, or mixtures thereof.

8. Pigment particles according to claim 1 wherein the pigment particles have an average particle diameter of no more than about 250 nanometers.

9. Pigment particles according to claim 1 wherein the pigment particles have an average particle diameter of no more than about 200 nanometers.

10. Pigment particles according to claim 1 wherein the pigment particles have a particle size distribution of GSD equal to no more than about 1.3.

11. An ink composition comprising water and pigment particles, said pigment particles being prepared by a process which comprises (a) preparing a solution of a polyalkylene oxide compound in water; (b) preparing a solution of a cationic dye in water; (c) admixing the solution containing the polyalkylene oxide compound with the solution containing the cationic dye to form a mixture; (d) adding to the mixture a solution containing a heteropolyacid in (i) water, (ii) an alcohol, or (iii) a mixture thereof, thereby resulting in formation of pigment particles having an average particle diameter of no more than about 300 nanometers; and (e) after addition of the heteropolyacid to the mixture, neutralizing the mixture by addition of a base.

12. An ink composition according to claim 11 wherein the pigment is present in the ink in an amount of at least about 2 percent by weight of the ink.

13. An ink composition according to claim 11 wherein the pigment is present in the ink in an amount of no more than about 10 percent by weight of the ink.

14. A process for preparing pigment particles which comprises (a) preparing a solution of a polyalkylene oxide compound in water; (b) preparing a solution of a cationic dye in water; (c) admixing the solution containing the polyalkylene oxide compound with the solution containing the cationic dye to form a mixture; (d) adding to the mixture a solution containing a heteropolyacid in (i) water, (ii) an alcohol, or (iii) a mixture thereof, thereby resulting in formation of pigment particles having an average particle diameter of no more than about 300 nanometers; and (e) after addition of the heteropolyacid to the mixture, neutralizing the mixture by addition of a base.

15. A process which comprises incorporating into an ink jet printing apparatus an ink according to claim 11 and causing droplets of the ink composition to be ejected in an imagewise pattern onto a substrate.

16. A process according to claim 15 wherein the printing apparatus employs a thermal ink jet process wherein the ink in the nozzles is selectively heated in an imagewise pattern, thereby causing droplets of the ink to be ejected in imagewise pattern.

17. A process according to claim 15 wherein the printing apparatus employs an acoustic ink jet process wherein droplets of the ink are caused to be ejected in imagewise pattern by acoustic beams.

18. A process according to claim 15 wherein the printing apparatus employs a piezoelectric ink jet process, wherein droplets of the ink are caused to be ejected in imagewise pattern by oscillations of piezoelectric vibrating elements.

19. A process according to claim 15 wherein the substrate is a plain paper.

20. A process according to claim 15 wherein the substrate is a transparency.

* * * * *